US012679392B2

(12) United States Patent
Yamada et al.

(10) Patent No.: US 12,679,392 B2
(45) Date of Patent: Jul. 14, 2026

(54) MOTION MANAGER, VEHICLE, VEHICLE CONTROL METHOD, AND NON-TRANSITORY STORAGE MEDIUM

(71) Applicant: TOYOTA JIDOSHA KABUSHIKI KAISHA, Toyota (JP)

(72) Inventors: Yoshihisa Yamada, Nagoya (JP); Kazuki Miyake, Okazaki (JP); Wataru Kanda, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 501 days.

(21) Appl. No.: 17/901,290

(22) Filed: Sep. 1, 2022

(65) Prior Publication Data

US 2023/0082947 A1     Mar. 16, 2023

(30) Foreign Application Priority Data

Sep. 15, 2021     (JP) ................................. 2021-150002

(51) Int. Cl.
    *B60W 50/029*     (2012.01)
    *B60W 50/02*     (2012.01)
    *B60W 50/00*     (2006.01)

(52) U.S. Cl.
    CPC ...... *B60W 50/029* (2013.01); *B60W 50/0205* (2013.01); *B60W 2050/0083* (2013.01); *B60W 2050/022* (2013.01); *B60W 2050/0292* (2013.01); *B60W 2050/0295* (2013.01)

(58) Field of Classification Search
    CPC .... B60W 50/00; B60W 50/02; B60W 50/029; B60W 50/0205; B60W 2050/0001; B60W 2050/0002; B60W 2050/0004; B60W 2050/0062; B60W 2050/0075; B60W 2050/0083; B60W 2050/022; B60W 2050/0292; B60W 2050/0295; B60W 2050/0005
    USPC ........................................................ 701/292
    See application file for complete search history.

(56) References Cited

U.S. PATENT DOCUMENTS

2020/0070849 A1*  3/2020  Suzuki ................. B60W 10/20
2021/0403013 A1*  12/2021  Jung ...................... B60K 28/10
2022/0281478 A1*  9/2022  Shedge ............. B60W 60/0015

FOREIGN PATENT DOCUMENTS

CN        110871788 A       3/2020
JP        2020-032894 A     3/2020
JP        2021-107225 A     7/2021

* cited by examiner

*Primary Examiner* — Khoi H Tran
*Assistant Examiner* — Sarah A Tran
(74) *Attorney, Agent, or Firm* — Oliff PLC

(57) ABSTRACT

A motion manager configured to request motion of a vehicle according to a kinematic plan on driver assistance of the vehicle to at least one of a plurality of actuators provided in the vehicle includes one or more processors. The one or more processors are configured to arbitrate a plurality of kinematic plans respectively set in a plurality of applications, calculate a motion request to the vehicle based on an arbitration result of the kinematic plans, distribute the motion request to at least one of the actuators, and receive, when an abnormality occurs in at least one of the actuators, information indicating a function in which the abnormality occurs and information for setting an operation of an application corresponding to the abnormality from among the applications.

14 Claims, 5 Drawing Sheets

| BIT LENGTH | NAME |
|---|---|
| 2 | LATERAL CONTROL SYSTEM FAIL CLASS |
| 2 | DRIVER BRAKE INPUT FAIL CLASS |
| 2 | AUTONOMOUS BRAKING FAIL CLASS (MAIN) |
| 2 | AUTONOMOUS BRAKING FAIL CLASS (SUB) |
| 4 | DRIVING SYSTEM FAIL CLASS |
| 2 | SHIFT CONTROL FAIL CLASS |

FIG. 5

| (A) INFLUENCED VEHICLE VELOCITY RANGE | | (B) MALFUNCTIONING PORTION | | (C) OPERATION MODE | |
|---|---|---|---|---|---|
| 00 | ENTIRE RANGE | 000 | NORMAL | 00 | NORMAL |
| 01 | EXCEEDING V(0) | 001 | HYDRAULIC PRESSURE BRK | 01 | FIXED MODE |
| 10 | V(1) TO V(0) | 010 | PARKING BRK | ••• | |
| 11 | STOP (V(1) OR LESS) | 011 | P-LOCK MECHANISM | 11 | STOP FROM BACKUP |
| | | ••• | | | |
| | | 100 | PT-BRK COMMUNICATION | | |
| | | 111 | STR-BRK COMMUNICATION | | |

MOTION MANAGER, VEHICLE, VEHICLE CONTROL METHOD, AND NON-TRANSITORY STORAGE MEDIUM

CROSS-REFERENCE TO RELATED APPLICATION

This application claims priority to Japanese Patent Application No. 2021-150002 filed on Sep. 15, 2021, incorporated herein by reference in its entirety.

BACKGROUND

1. Technical Field

The present disclosure relates to a motion manager, a vehicle, a vehicle control method, and a non-transitory storage medium.

2. Description of Related Art

A vehicle is well-known which is composed of a plurality of applications that set and request kinematic plans on driver assistance of the vehicle, a motion manager that unifies a plurality of kinematic plans from the plurality of applications and sets motion requests based on the unified kinematic plan, and an actuator system that realizes the set motion requests.

Regarding such a vehicle, for example, Japanese Unexamined Patent Application Publication No. 2020-032894 discloses a technology for arbitrating information indicating motion of a vehicle in the longitudinal direction and arbitrating information indicating motion of the vehicle in the lateral direction, and, based on arbitration results, for outputting instruction information used for driving an actuator.

SUMMARY

When an abnormality occurs in any of a plurality of actuators provided in the vehicle as described above, a change in an operation of a corresponding application may be required. At this time, in a configuration where the application directly receives, from the actuator, information required for changing the operation of the application, it may be configured that a plurality of applications individually receives the information from the actuator, and thus a relationship between the applications, a motion manager, and the actuators may become complicated. For this reason, when a design change, such as adding or correcting a function, is executed in each application, a large amount of work or work time may be required.

The present disclosure provides a motion manager, a vehicle, a vehicle control method, and a non-transitory storage medium that can easily execute a design change in an operation of a corresponding application when an actuator is failed.

A motion manager according to a first aspect of the present disclosure is configured to request motion of a vehicle according to a kinematic plan on driver assistance of the vehicle to at least one of a plurality of actuators provided in the vehicle. The motion manager includes one or more processors configured to arbitrate a plurality of kinematic plans respectively set in a plurality of applications, calculate a motion request to the vehicle based on an arbitration result of the kinematic plans, distribute the motion request to at least one of the actuators, and receive, when an abnormality occurs in at least one of the actuators, information indicating a function in which the abnormality occurs and information for setting an operation of an application corresponding to the abnormality from among the applications.

In this manner, since the motion manager receives the information indicating the function in which the abnormality occurs and the information for setting the operation of the application corresponding to the abnormality from the actuator in which the abnormality occurs, the application can set the operation at a time of the occurrence of the abnormality by receiving these pieces of information from the motion manager. For this reason, even when an abnormality occurs in any of the actuators, it is possible to select an appropriate operation (for example, a continuation of the operation, stopping of the operation, retaining of the function, or restarting). Further, since the information required by the application at the time of the occurrence of the abnormality in the actuator can be received via the motion manager, it is possible to restrict the relationship between the application, the motion manager, and the actuator from becoming complicated.

In the first aspect, the information for setting the operation of the application corresponding to the abnormality may include at least one of information indicating a vehicle velocity range influenced by the abnormality, information indicating a portion in which the abnormality occurs, and information indicating an operation mode after the occurrence of the abnormality.

In this manner, the application can receive, via the motion manager, at least one of the information indicating the vehicle velocity range influenced by the abnormality, the information indicating the portion in which the abnormality occurs, and the information indicating an operation mode after the occurrence of the abnormality. For this reason, it is possible to appropriately set the operation of the application corresponding to the abnormality and to restrict the relationship between the application, the motion manager, and the actuator from becoming complicated.

In the first aspect, the information for setting the operation of the application corresponding to the abnormality may include each of information indicating a vehicle velocity range influenced by the abnormality, information indicating a portion in which the abnormality occurs, and information indicating an operation mode after the occurrence of the abnormality.

In this manner, the application can receive, via the motion manager, each of the information indicating the vehicle velocity range influenced by the abnormality, the information indicating the portion in which the abnormality occurs, and the information indicating the operation mode after the occurrence of the abnormality. For this reason, it is possible to appropriately set the operation of the application corresponding to the abnormality and to restrict the relationship between the application, the motion manager, and the actuator from becoming complicated.

In the first aspect, the portion in which the abnormality occurs may include communication between the actuators.

In this manner, the application can receive, via the motion manager, each of the information indicating the vehicle velocity range influenced by the abnormality, the information indicating the portion in which the abnormality occurs, and the information indicating the operation mode after the occurrence of the abnormality. For this reason, it is possible to appropriately set the operation of the application corresponding to the abnormality and to restrict the relationship between the application, the motion manager, and the actuator from becoming complicated.

In the first aspect, the one or more processors may be configured to transmit, to at least the application corresponding to the abnormality from among the applications, the received information indicating the function in which the abnormality occurs and the received information for setting the operation of the application corresponding to the abnormality.

In this manner, since the information required by the application at the time of the occurrence of the abnormality in the actuator can be received via the motion manager, it is possible to restrict the relationship between the application, the motion manager, and the actuator from becoming complicated.

A vehicle according to a second aspect of the present disclosure includes a driver assistance system including a plurality of applications configured to independently set each of a plurality of kinematic plans on driver assistance of a vehicle, and a motion manager. The motion manager is configured to request motion of the vehicle according to the kinematic plan set in at least one of the applications to at least one of a plurality of actuators provided in the vehicle, and receive, when an abnormality occurs in at least one of the actuators, information indicating a function in which the abnormality occurs and information for setting an operation of an application corresponding to the abnormality from among the applications.

In the second aspect, the information for setting the operation of the application corresponding to the abnormality may include at least one of information indicating a vehicle velocity range influenced by the abnormality, information indicating a portion in which the abnormality occurs, and information indicating an operation mode after the occurrence of the abnormality.

In the second aspect, the information for setting the operation of the application corresponding to the abnormality may include each of information indicating a vehicle velocity range influenced by the abnormality, information indicating a portion in which the abnormality occurs, and information indicating an operation mode after the occurrence of the abnormality.

In the second aspect, the portion in which the abnormality occurs may include communication between the actuators.

In the second aspect, the motion manager may be configured to transmit, to at least the application corresponding to the abnormality from among the applications, the received information indicating the function in which the abnormality occurs and the received information for setting the operation of the application corresponding to the abnormality.

A vehicle control method according to a third aspect of the present disclosure is executed by a computer. The vehicle control method includes receiving a plurality of kinematic plans from a plurality of applications configured to set the kinematic plans on driver assistance of a vehicle, arbitrating the received kinematic plans, calculating a motion request to the vehicle based on an arbitration result of the kinematic plans, distributing the motion request to at least one of a plurality of actuators provided in the vehicle, and further receiving, when an abnormality occurs in at least one of the actuators, information indicating a function in which the abnormality occurs and information for setting an operation of an application corresponding to the abnormality from among the applications.

A fourth aspect of the present disclosure is a non-transitory storage medium storing instructions that are executable by a computer and that cause the computer to execute functions. The functions include receiving a plurality of kinematic plans from a plurality of applications configured to set the kinematic plans on driver assistance of a vehicle, arbitrating the received kinematic plans, calculating a motion request to the vehicle based on an arbitration result of the kinematic plans, distributing the motion request to at least one of a plurality of actuators provided in the vehicle, and further receiving, when an abnormality occurs in at least one of the actuators, information indicating a function in which the abnormality occurs and information for setting the operation of the application corresponding to the abnormality from among the applications.

With each aspect of the present disclosure, it is possible to provide a motion manager, a vehicle, a vehicle control method, and a non-transitory storage medium that can easily execute a design change in an operation of a corresponding application when an actuator is failed.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 5 is a diagram used for describing an example of additional information included in the fail classes.

DETAILED DESCRIPTION OF EMBODIMENTS

Figure 1:
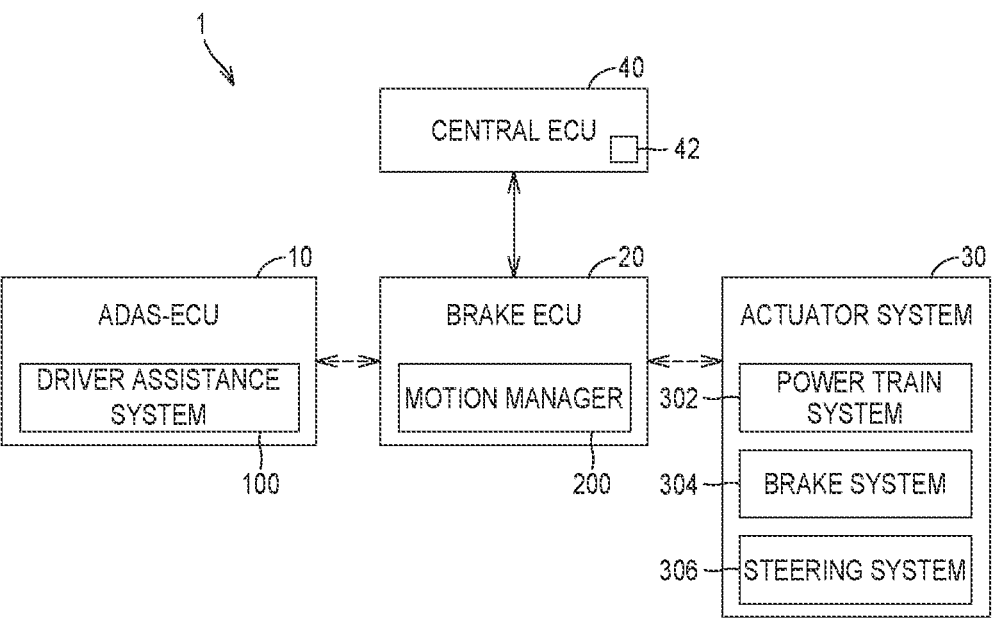
FIG. 1 is a diagram illustrating an example of a configuration of a vehicle.

Hereinafter, embodiments of the present disclosure will be described in detail with reference to the drawings. The same or corresponding parts in the drawings are denoted by the same reference signs and the description thereof will not be repeated.

FIG. 1 is a diagram illustrating an example of a configuration of a vehicle 1. As illustrated in FIG. 1, the vehicle 1 includes an ADAS-electronic control unit (ECU) 10, a brake ECU 20, an actuator system 30, and a central ECU 40.

The vehicle 1 may be a vehicle having a configuration capable of realizing a function of a driver assistance system described below, and may be, for example, a vehicle having an engine as a driving source, a battery electric vehicle having an electric motor as a driving source, or a hybrid electric vehicle having an engine and an electric motor mounted thereon and using at least one of them as a driving source.

The ADAS-ECU 10, the brake ECU 20, and the central ECU 40 are all computers each of which has a processor that executes a program, such as a central processing unit (CPU), a memory, and an input/output interface. The memory includes a non-transitory storage medium storing a program.

The ADAS-ECU 10 includes a driver assistance system 100 having a function of driver assistance of the vehicle 1. The driver assistance system 100 is configured to realize various functions for assisting driving of the vehicle 1 including at least one of a steering control, a driving control, and a braking control of the vehicle 1 by executing applications mounted on the driver assistance system 100. Examples of the applications mounted on the driver assistance system 100 include an application that realizes a function of an autonomous driving system (AD), an application that realizes a function of an autonomous parking system, and an application (hereinafter, referred to as an ADAS application) that realizes a function of an advanced driver assistance system (ADAS), and the like.

Examples of the ADAS application include at least one of an application that realizes a function of follow-up traveling (an adaptive cruise control (ACC), or the like) that travels while constantly keeping a distance with a preceding vehicle, an application that realizes a function of an auto speed limiter (ASL) that recognizes a vehicle velocity limit and maintains an upper limit of velocity of a subject vehicle, an application that realizes a function of a lane maintenance assistance (a lane keeping assist (LKA), a lane tracing assist (ASL), or the like) that executes maintenance of a lane in which a vehicle travels, an application that realizes a function of a collision damage mitigation braking (an autonomous emergency braking (AEB), a pre-crash safety (PCS), or the like) that executes autonomous braking to mitigate damage caused by collision, and an application that realizes a function of a lane departing warning (a lane departure warning (LDW), a lane departure alert (LDA), or the like) that warns the vehicle 1 of departure from a lane in which it travels.

Each application of the driver assistance system 100 outputs, to the brake ECU 20 (more specifically, the motion manager 200), a request for a kinematic plan that guarantees a commercial value (a function) of each application based on information of a vehicle surroundings situation acquired (input) from a plurality of sensors (not shown), an assistance request of a driver, or the like. Examples of the plurality of sensors include a vision sensor, such as a forward-looking camera, a radar, light detection and ranging (LiDAR), a position detection device, or the like.

The forward-looking camera is arranged, for example, on the backside of a rear-view mirror in a vehicle cabin and is used for capturing an image of the front of the vehicle. The radar is a distance measuring device that beams radio waves having a short wavelength on an object, detects the radio waves returning from the object, and measures a distance or a direction to the object. The LiDAR is a distance measuring device that beams a laser beam (light, such as infrared rays) in a pulse shape on an object and measures a distance by the time until it is reflected by the object and returns. The position detection device is composed of, for example, the Global Positioning System (GPS) that detects a position of the vehicle 1 using information received from a plurality of satellites orbiting the earth.

Each application acquires information of the vehicle surroundings situation that integrates detection results of one or more sensors as recognition sensor information, and acquires an assistance request of the driver by way of a user interface (not shown), such as a switch. For example, each application can recognize other vehicles, obstacles, or people on the surroundings of the vehicle by image processing on an image or video on the surroundings of the vehicle acquired by the plurality of sensors, using artificial intelligence (AI) or image processing processor.

Further, the kinematic plan includes, for example, a request for longitudinal acceleration/deceleration generated in the vehicle 1, a request for a steering angle of the vehicle 1, a request for holding stopping of the vehicle 1, or the like.

Examples of the request for the longitudinal acceleration/deceleration generated in the vehicle 1 include an operation request to a power train system 302 or an operation request to a brake system 304.

Examples of the request for holding the stopping of the vehicle 1 include requests for permitting and prohibiting an operation of at least one of an electric parking brake and a parking lock mechanism (neither shown).

The electric parking brake limits rotation of wheels of the vehicle 1 by, for example, operating an actuator. The electric parking brake may be configured to limit the rotation of the wheels by, for example, operating a brake for a parking brake provided on a part of a plurality of wheels provided on the vehicle 1 using an actuator. Alternatively, the electric parking brake may limit the rotation of the wheels by operating an actuator for the parking brake, arbitrating hydraulic pressure supplied to the brake device of the brake system 304, and operating the brake device.

The parking lock mechanism limits rotation of an output shaft of a transmission by operating an actuator. The parking lock mechanism fits, for example, a protrusion unit provided at a tip of a parking lock pole, a position of which is arbitrated by an actuator into a tooth portion of a gear (a lock gear) provided connected to a rotating element in the transmission of the vehicle 1. In this manner, the rotation of the output shaft of the transmission is limited and the rotation of driving wheels is limited.

The application mounted on the driver assistance system 100 is not particularly limited to the above-described applications. An application that realizes other functions may be added or an existing application may be omitted, and, in particular, the number of the mounted applications is not limited.

Further, in the present embodiment, a case where the ADAS-ECU 10 includes the driver assistance system 100 composed of a plurality of applications is described, but for example, an ECU may be provided for each application. For example, the driver assistance system 100 may be composed of an ECU having an application that realizes a function of an autonomous driving system mounted thereon, an ECU having an application that realizes a function of an autonomous parking system mounted thereon, and an ECU having an ADAS application mounted thereon.

The brake ECU 20 includes the motion manager 200. In the present embodiment, a case where the brake ECU 20 has a hardware configuration including the motion manager 200 is described as an example, but the motion manager 200 may be provided as a single ECU separately from the brake ECU 20, or may be included in another ECU different from the brake ECU 20. The brake ECU 20 is configured to be communicable with each of the ADAS-ECU 10, various ECUs included in the actuator system 30, and the central ECU 40.

The motion manager 200 requests, to the actuator system 30, motion of the vehicle 1 according to the kinematic plans set in at least one of the plurality of applications of the driver assistance system 100. A detailed configuration of the motion manager 200 will be described below.

The actuator system 30 is configured to realize the request for the motion of the vehicle 1 output from the motion manager 200. The actuator system 30 includes a plurality of actuators. FIG. 1 illustrates an example where the actuator system 30 includes, for example, a power train system 302, a brake system 304, and a steering system 306 as actuators. The number of actuators that are requesting destinations of the motion manager 200 is not limited to three as described above, but may be four or more, or may be two or less.

The power train system 302 includes a power train capable of generating a driving force on the driving wheels of the vehicle 1 and an ECU (neither shown) that controls an operation of the power train. The power train includes, for example, at least one of an internal combustion engine, such as a gasoline engine or a diesel engine, a transmission including a gearbox, a differential device, or the like, a motor generator as a driving source, a power accumulation device that accumulates power supplied to the motor generator, a power conversion device that mutually converts power between the motor generator and the power accumulation device, and a power generating source, such as a fuel cell. The ECU that controls the operation of the power train executes a control of a corresponding device so as to realize the request for the motion from the motion manager 200 to the corresponding device in the power train system 302.

The brake system 304 includes, for example, a plurality of brake devices provided on respective wheels of the vehicle 1. The brake devices include, for example, a hydraulic brake, such as a disc brake that generates a braking force using hydraulic pressure. As the brake device, for example, a motor generator that is connected to a wheel and that generates regenerative torque, may be further included. A braking operation of the vehicle 1 using the plurality of brake devices is controlled by the brake ECU 20. Separately from the motion manager 200, for example, a control unit (not shown) used for controlling the brake system 304 is provided in the brake ECU 20.

The steering system 306 includes, for example, a steering device capable of changing a steering angle of a steering wheel (for example, a front wheel) of the vehicle 1 and an ECU (neither shown) that controls an operation of the steering device. The steering device includes, for example, the steering wheel that changes the steering angle according to an operation amount, and an electric power steering (EPS) in which the steering angle can be arbitrated by an actuator, separately from the operation of the steering wheel. The ECU that controls the operation of the steering device controls an operation of an actuator of the EPS.

The central ECU 40 includes a memory 42 capable of updating stored contents. The central ECU 40 is configured to be communicable with, for example, the brake ECU 20, and configured to be communicable with a device (not shown, for example, a server) outside the vehicle 1 by way of a communication module (not shown). When update information is received from a server outside the vehicle 1, the central ECU 40 updates information stored in the memory 42 using the received update information. Predetermined information is stored in the memory 42. The predetermined information includes, for example, information read from various ECUs when the system of the vehicle 1 is started.

In the present embodiment, it is described that the central ECU 40 reads predetermined information from various ECUs when the system of the vehicle 1 is started, but may have a function, such as relaying communication between various ECUs (a gateway function).

Figure 2:
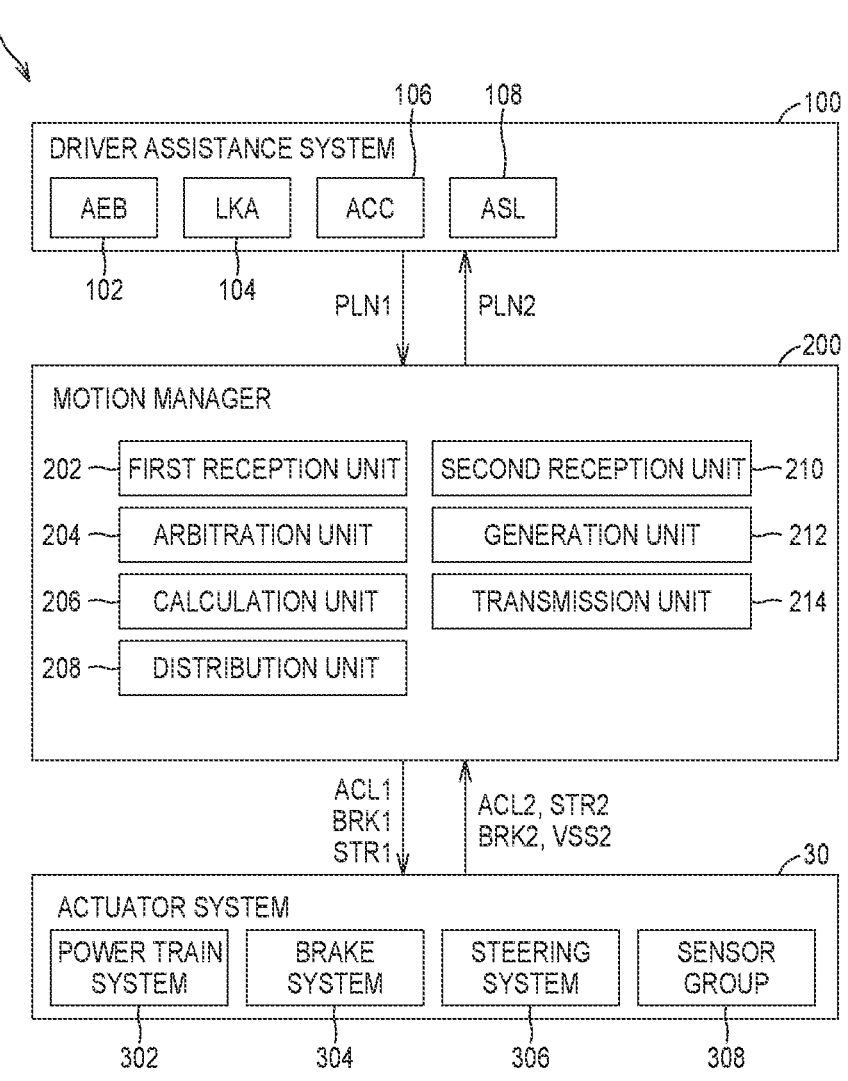
FIG. 2 is a diagram used for describing an example of an operation of a motion manager.

Hereinafter, an example of an operation of the motion manager 200 will be described in detail with reference to FIG. 2. FIG. 2 is a diagram used for describing an example of the operation of the motion manager 200.

FIG. 2 illustrates, as an example, a case where the driver assistance system 100 includes, for example, an AEB 102, an LKA 104, an ACC 106, and an ASL 108 as applications. A request for kinematic plans set in at least one of a plurality of applications is transmitted from the driver assistance system 100 to the motion manager 200 as a request signal PLN1.

The request signal PLN1 includes, for example, information on a target acceleration set in the ACC, the AEB, or the ASL as one of the kinematic plans, information on a target curvature set in the LKA as one of the kinematic plans, or the like.

The motion manager 200 sets the motion requested to the vehicle 1 based on the request for the kinematic plans included in the received request signal PLN1, and requests the actuator system 30 to realize the set motion. In other words, the motion manager 200 transmits, to the actuator system 30, an operation request to the power train system 302 as a request signal ACL1. The motion manager 200 transmits, to the actuator system 30, an operation request to the brake system 304 as a request signal BRK1. Further, the motion manager 200 transmits, to the actuator system 30, an operation request to the steering system 306 as a request signal STR1.

The request signal ACL1 includes, for example, information on a requested value of driving torque or a driving force or information on a method of arbitration (for example, which to select between a maximum value or a minimum value or whether to change a value stepwise or gradually).

The request signal BRK1 includes, for example, information on a requested value of braking torque, information on a method of arbitration (for example, whether to change a value stepwise, gradually, or the like), or information on execution timing of braking (whether to immediately execute, or the like).

The request signal STR1 includes, for example, information on a target steering angle, information on whether the target steering angle is effective, or information on upper and lower limit torques of an assistance torque of an operation of the steering wheel.

The actuator that has received a corresponding request signal from among the plurality of actuators composing the actuator system 30 is controlled such that an operation request included in the request signal is realized.

Hereinafter, an example of a configuration of the motion manager 200 will be described. As illustrated in FIG. 2, the motion manager 200 includes a first reception unit 202, an arbitration unit 204, a calculation unit 206, and a distribution unit 208.

The first reception unit 202 receives a request for the kinematic plans output by one or more applications of the driver assistance system 100. Details of the kinematic plan in the present embodiment will be described below.

The arbitration unit 204 arbitrates the request for the kinematic plans received from the respective applications via the first reception unit 202. An example of this arbitration processing can be selecting one kinematic plan from among the kinematic plans based on a predetermined selection criterion. Alternatively, another example of the arbitration processing can be setting a new kinematic plan based on the kinematic plans. The arbitration unit 204 may further add predetermined information received from the actuator system 30 and arbitrate the request for the kinematic plans. Further, the arbitration unit 204 may determine whether to temporarily prioritize the motion of the vehicle 1 that is required according to a driver state and a vehicle state over the motion of the vehicle 1 that corresponds to the kinematic plan determined based on an arbitration result.

The calculation unit 206 calculates motion requests based on the arbitration result of the request for the kinematic plans in the arbitration unit 204 and the motion of the vehicle 1 that is determined based on the arbitration result. The motion request is a physical amount used for controlling at least one actuator of the actuator system 30, and includes a physical amount different from a physical amount of the request for the kinematic plans. For example, when the request for the kinematic plans (a first request) is a longitudinal acceleration, the calculation unit 206 calculates a value obtained by converting the acceleration into the driving force or the driving torque to be the motion request (a second request).

The distribution unit 208 distributes the motion requests calculated by the calculation unit 206 to at least one actuator of the actuator system 30. When, for example, the acceleration of vehicle 1 is requested, the distribution unit 208 distributes the motion requests only to the power train system 302. Alternatively, when deceleration of the vehicle 1 is requested, the distribution unit 208 appropriately distributes the motion requests to the power train system 302 and the brake system 304 in order to realize a target deceleration.

The motion manager 200 further includes a second reception unit 210, a generation unit 212, and a transmission unit 214.

The second reception unit 210 receives, from the actuator system 30, signals ACL2, BRK2, STR2, VSS2 that include predetermined information. The predetermined information received by the second reception unit 210 will be described below.

Using the signals received by the second reception unit 210, the generation unit 212 generates predetermined information to be transmitted to the applications of the driver assistance system 100. The predetermined information generated in the generation unit 212 will be described below.

The transmission unit 214 transmits a signal indicating the predetermined information generated in the generation unit 212 to the driver assistance system 100 as a signal PLN2.

Information on a state of the power train system 302 is transmitted from the power train system 302 of the actuator system 30 to the motion manager 200 as a signal ACL2. Examples of the information on the state of the power train system 302 include information on an operation of an accelerator pedal, information on an actual driving torque or an actual driving force of the power train system 302, actual shift range information, information on upper and lower limits of the driving torque, information on upper and lower limits of the driving force, or information on reliability of the power train system 302.

Information on a state of the brake system 304 is transmitted from the brake system 304 of the actuator system 30 to the motion manager 200 as a signal BRK2. Examples of the information on the state of the brake system 304 include information on an operation of the brake pedal, information on a braking torque requested by the driver, information on a requested value of the braking torque after arbitration, information on the actual braking torque after arbitration, or information on reliability of the brake system 304.

Information on a state of the steering system 306 is transmitted from the steering system 306 of the actuator system 30 to the motion manager 200 as a signal STR2. Examples of the information on the state of the steering system 306 include information on reliability of the steering system 306, information on whether the driver grips the steering wheel, information on torque for operating the steering wheel, or information on a rotation angle of the steering wheel.

Further, the actuator system 30 includes a sensor group 308, in addition to the power train system 302, the brake system 304, and the steering system 306 that are described above.

The sensor group 308 includes a plurality of sensors that detect behavior of the vehicle 1. The sensor group 308 includes, for example, a longitudinal G sensor that detects a vehicle body acceleration in the longitudinal direction of the vehicle 1, a lateral G sensor that detects the vehicle body acceleration in the lateral direction of the vehicle 1, a wheel velocity sensor that is provided on each wheel and that detects a wheel velocity, and a yaw rate sensor that detects an angular velocity of the rotation angle (a yaw angle) in the yaw direction. The sensor group 308 transmits information including detection results of the plurality of sensors to the motion manager 200 as a signal VSS2. In other words, the signal VSS2 includes, for example, a detection value of the longitudinal G sensor, a detection value of the lateral G sensor, a detection value of the wheel velocity sensor of each wheel, a detection value of the yaw rate sensor, and information on reliability of each sensor.

The configuration of the device mounted on the vehicle 1 and the configuration of the motion manager 200 that are described above are examples, and can be added, replaced, changed, omitted, or the like as appropriate. Further, a function of each device can be appropriately integrated into one device or distributed to a plurality of devices, and executed.

In the vehicle 1 having the configuration as above, when an abnormality occurs in one of the actuators included in the actuator system 30, a change in the operation of the corresponding application from among the applications included in the driver assistance system 100 may be required. At this time, in a configuration where the application directly receives, from the actuator system 30 side, information required for changing the operation of the application, it may be configured that the applications individually receive the information from one actuator of the actuator system 30, and thus the relationship between the driver assistance system 100, the motion manager 200, and the actuator system 30 may become complicated.

Figures 3, 4:
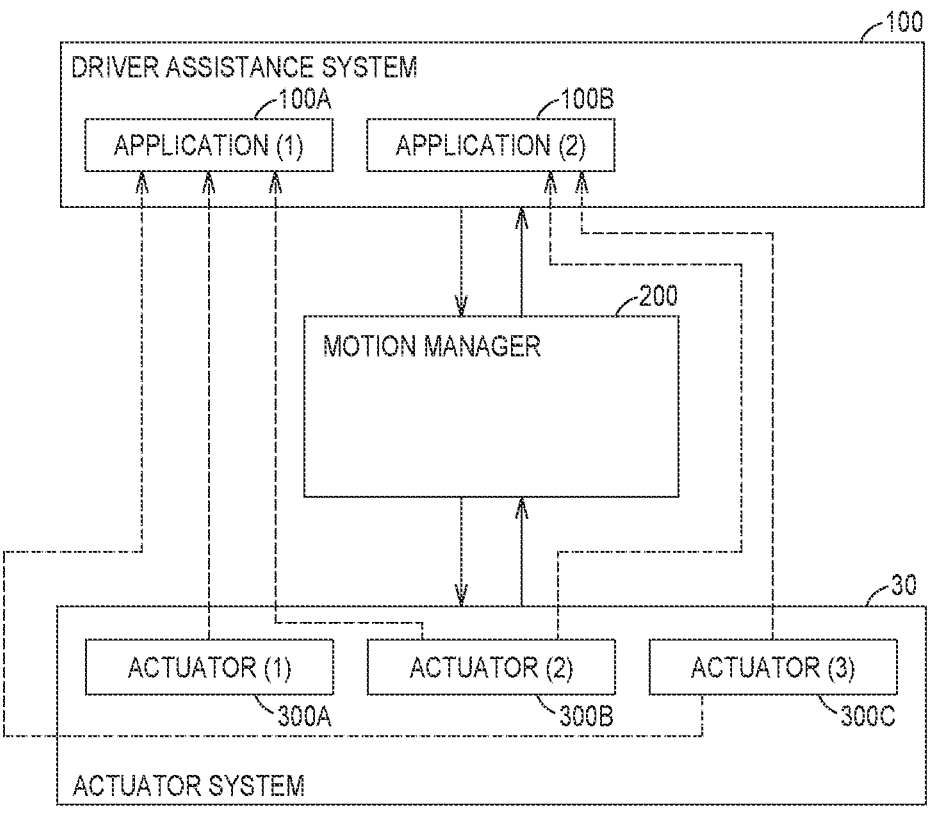
FIG. 3 is a diagram illustrating a comparative example of a flow of information between an actuator system and a driver assistance system.
FIG. 4 is a diagram used for describing an example of various fail classes.

FIG. 3 is a diagram illustrating a comparative example of a flow of information between the actuator system 30 and the driver assistance system 100. In FIG. 3, it is assumed that the driver assistance system 100 includes, for example, an application (1) 100A and an application (2) 100B. The application (1) 100A and the application (2) 100B correspond to any of the various applications included in the driver assistance system 100 illustrated in FIG. 1 described above.

Further, in FIG. 3, the actuator system 30 includes, for example, an actuator (1) 300A, an actuator (2) 300B, and an actuator (3) 300C. The actuator (1) 300A to the actuator (3) 300C correspond to any of the various actuators included in the actuator system 30 illustrated in FIGS. 1 and 2 described above.

For example, it is assumed that the actuator (1) 300A is to be operated according to a kinematic plan set by the application (1) 100A. Then, when an abnormality occurs in the actuator (1) 300A, the kinematic plan set by the application (1) 100A is changed.

At this time, since the application (1) 100A acquires predetermined information from the other actuators (2) 300B and (3) 300C in addition to the actuator (1) 300A, it is configured that the application (1) 100A is communicable with each of the actuator (1) 300A, the actuator (2) 300B, and the actuator (3) 300C.

Similarly, it is assumed that the actuator (2) 300B is to be operated according to a kinematic plan set by the application (2) 100B. Then, when an abnormality occurs in the actuator (2) 300B, the kinematic plan set by the application (2) 100B is changed.

At this time, since the application (2) 100B acquires predetermined information from the other actuator (3) 300C in addition to the actuator (2) 300B, it is configured that the application (2) 100B is communicable with each of the actuator (2) 300B and the actuator (3) 300C.

In this manner, when each of the applications is individually set to acquire information from at least one of the actuators included in the actuator system 30, the relationship between the driver assistance system 100 including the applications, the motion manager 200, and the actuator system 30 may become complicated. For this reason, when a design change, such as adding or correcting a function, is executed in the application, a large amount of work or work time may be required.

Therefore, in the present embodiment, when an abnormality occurs in at least one of the actuators of the actuator system 30, the motion manager 200 receives information indicating a function in which the abnormality has occurred and information for setting an operation of the application corresponding to the abnormality in the driver assistance system 100.

In this manner, since the motion manager 200 receives the information indicating the function in which the abnormality has occurred and the information for setting the operation of the application corresponding to the abnormality from the actuator in which the abnormality has occurred, the application can set the operation at the time of the occurrence of the abnormality by receiving the information from the motion manager 200. For this reason, even when an abnormality occurs in any of the actuators, it is possible to select an appropriate operation (for example, a continuation of the operation, stopping of the operation, retaining of the function, or restarting). For this reason, since the information required by the application at the time of the occurrence of the abnormality in the actuator can be received via the motion manager 200, it is possible to restrict the relationship between the driver assistance system 100, the motion manager 200, and the actuator system 30 from becoming complicated.

In the present embodiment, the second reception unit 210 receives, for example, the signals ACL2, BRK2, STR2, and VSS2 from the actuator system 30, and receives the information indicating a function in which the abnormality has occurred when an abnormality has occurred in any of the actuators and the information for setting the operation of the application corresponding to the abnormality in the driver assistance system 100.

Hereinafter, information received by the motion manager 200 from the actuator system 30 and information transmitted from the motion manager 200 to the driver assistance system 100 will be described in detail with reference to FIGS. 4 and 5.

In the present embodiment, the information indicating the function in which the abnormality has occurred and the information for setting the operation of the application corresponding to the abnormality that are described above are included in the information included in various signals transmitted from the actuator system 30 to the motion manager 200.

For example, information on the state of the power train system 302 is transmitted from the power train system 302 to the motion manager 200 as the signal ACL2. Examples of the information on the state of the power train system 302 include the information on reliability of the power train system 302. The information on reliability of the power train system 302 includes, as the above-described information indicating the function in which the abnormality has occurred, at least one of first ACL information indicating that a target actuator (for example, a driving source or a shift device) is normally operating, second ACL information indicating that a state is in a protective control in which an assistance amount or an operation amount is limited, third ACL information indicating that a state is in an abnormality although failure has not been confirmed, and a control is in an invalid state (a state in which the actuator does not operate even when a control command exists), and fourth ACL information indicating a failed state in which failure has been confirmed. In other words, the information on reliability of the power train system 302 includes, for example, information in which numerical values (for example, numerical values of 1 to 4 or binary two-digit numerical values) respectively corresponding to the first ACL information to the fourth ACL information are associated with pieces of identification information for identifying the target actuator. Since there are two types of requests for the driving force, that is, an upper limit request and a lower limit request, the information on reliability of the power train system 302 includes information divided into an upper limit side and a lower limit side of the driving force, each of which includes identification information in association with a numerical value.

Further, in the present embodiment, as the information for setting the operation of the application corresponding to the abnormality, the information on the power train system 302 includes information indicating a vehicle velocity range that is influenced when the target actuator is failed, information indicating a portion (hereinafter, referred to as a malfunctioning portion) in which an abnormality has occurred, and information indicating an operation mode after the occurrence of the abnormality.

Further, the information on the state of the brake system 304 is transmitted from the brake system 304 to the motion manager 200 as the signal BRK2. Examples of the information on the state of the brake system 304 include the information on reliability of the brake system 304. The information on reliability of the brake system 304 includes at least one of first BRK information indicating that a target actuator (for example, an actuator of the hydraulic pressure brake) is normally operating, second BRK information indicating that the state is in the protective control, third BRK information indicating that the state is in the abnormality although failure has not been confirmed, and the control is in the invalid state, and fourth BRK information indicating the failed state in which failure has been confirmed. In other words, the information on reliability of the brake system 304 includes, for example, information in which numerical values respectively corresponding to the first BRK information to the fourth BRK information are associated with pieces of identification information for identifying the target actuator.

Further, in the present embodiment, as the information for setting the operation of the application corresponding to the abnormality, the information on the brake system 304 includes information indicating the vehicle velocity range that is influenced when the target actuator is failed, information indicating the malfunctioning portion, and information indicating the operation mode after the occurrence of the abnormality.

Further, the information on the state of the steering system 306 is transmitted from the steering system 306 to the motion manager 200 as the signal STR2. Examples of the information on the state of the steering system 306 include the information on reliability of the steering system 306. The information on reliability of the steering system 306 includes at least one of first STR information indicating that a target actuator (for example, the actuator of the EPS) is normally operating, second STR information indicating that the state is in the protective control, third STR information indicating that the state is in the abnormality although failure has not been confirmed, and the control is in the invalid state, and fourth STR information indicating the failed state in which failure has been confirmed. In other words, the information on reliability of the steering system 306 includes, for example, information in which numerical values respectively corresponding to the first STR information to the fourth STR information are associated with pieces of identification information for identifying the target actuator.

Further, in the present embodiment, as the information for setting the operation of the application corresponding to the abnormality, the information on the steering system 306 includes information indicating the vehicle velocity range that is influenced when the target actuator is failed, information indicating the malfunctioning portion, and information indicating the operation mode after the occurrence of the abnormality.

The generation unit 212 of the motion manager 200 generates the signal PLN2 including predetermined information, using the signals received from the various actuators. The predetermined information includes a fail class indicating an operating state including the presence or absence of an abnormality in the various actuators. The generation unit 212 generates various fail classes using, for example, the information on reliability received from the various actuators.

The fail class has a data structure in which additional information can be added to, for example, information on the state, including the presence or absence of an abnormality in the various functions. The additional information is the above-described information for setting the operation of the application corresponding to abnormality, and includes the vehicle velocity range (hereinafter, referred to as an influenced vehicle velocity range) that is influenced when the target actuator is failed, the malfunctioning portion, and the operation mode (hereinafter, referred to as an operation mode) of the target actuator after the occurrence of the abnormality. The malfunctioning portion includes communication between the actuators, in addition to the failed actuator. The communication between the actuators includes, for example, communication between the power train system 302 and the brake system 304, between power train system 302 and the steering system 306, or between the brake system 304 and the steering system 306.

FIG. 4 is a diagram used for describing an example of various fail classes. FIG. 4 illustrates, for example, various fail classes and a data length set for the information on the state including the presence or absence of an abnormality in the various functions. Examples of the fail classes set in the vehicle 1 include a lateral control system fail class, a driver brake input fail class, an autonomous braking fail class (main), an autonomous braking fail class (sub), a driving system fail class, and a shift control fail class. Examples of the fail class are not limited to the types of fail classes illustrated in FIG. 4.

The various fail classes are composed by, for example, associating pieces of identification information (for example, labels) for identifying the types of the fail classes with numerical values indicating the states including the presence or absence of an abnormality in the functions. As the numerical values associated with the pieces of the identification information of the various fail classes, for example, a data length of 4 bits is set for the driving system fail class, and, for example, a data length of 2 bits is set for the fail classes excluding the driving system fail class. This is because, the driving system fail class has two types (the upper limit side and the lower limit side) of requests for driving torque (a driving force), and an information amount that is twice those of the other fail classes.

In the lateral control system fail class, information indicating whether a function of the lateral control system (for example, an LKS or an LKA) is in a normal state, the protective control state, the invalid state where an abnormality has occurred but failure has not been confirmed, or the failed state where failure has been confirmed is set as a numerical value (for example, a binary two-digit numerical value) in association with identification information.

In the driver brake input fail class, for example, information indicating whether a function of a brake control by an input of a driver is in the normal state, the protection control state, the invalid state where an abnormality has occurred but failure has not been confirmed, or the failed state where failure has been confirmed is set as a numerical value in association with identification information.

In the autonomous braking fail class (main), for example, information indicating whether a function of the brake control (for example, an AEB) at the time of autonomous driving is in the normal state, the protection control state, the invalid state where an abnormality has occurred but failure has not been confirmed, or the failed state where failure has been confirmed is set as a numerical value in association with identification information.

The autonomous braking fail class (sub) includes the same information as the autonomous braking fail class (main). The autonomous braking fail class (sub) is set as a backup used for ensuring redundancy in the control of the autonomous braking.

In the driving system fail class, for example, information indicating whether a function of the driving system used for an ACC, an ASL, or the like is in the normal state, the protection control state, the invalid state where an abnormality has occurred but failure has not been confirmed, or the failed state where failure has been confirmed is set as a numerical value in association with identification information.

In the shift control fail class, for example, information indicating whether a function of operating a transmission is in the normal state, the protection control state, the invalid state where an abnormality has occurred but failure has not been confirmed, or the failed state where failure has been confirmed is set as a numerical value in association with identification information.

The above-described additional information can be added to the above-described fail classes. FIG. 5 is a diagram used for describing an example of the additional information included in the fail classes. As illustrated in FIG. 5, as described above, as the additional information, (A) the influenced vehicle velocity range, (B) the malfunctioning portion, and (C) the operation mode are included.

(A) The information on the influenced vehicle velocity range includes, as an example in FIG. 5, one of a first vehicle velocity range indicating that the vehicle velocity range is an entire range, a second vehicle velocity range exceeding the vehicle velocity V(0) km/h, a third vehicle velocity range equal to or lower than the vehicle velocity V(0) km/h and higher than the vehicle velocity V(1) (<V(0)) km/h, and a fourth vehicle velocity range of a stopped state (the vehicle velocity equal to or lower than V(1) km/h). The above-described classification of the vehicle velocity ranges is an example, and the examples of the classification are not limited thereto.

Each of the first vehicle velocity range to the fourth vehicle velocity range is associated with a binary and two-digit numerical value. For example, "00" is associated with the first vehicle velocity range. Further, "01" is associated with the second vehicle velocity range. Further, "10" is associated with the third vehicle velocity range. Then, "11" is associated with the fourth vehicle velocity range.

(B) The information on the malfunctioning portion includes, as an example in FIG. 5, one of first malfunctioning portion information indicating that a portion is "normal" without a malfunctioning portion, second malfunctioning portion information indicating that a malfunctioning portion is the hydraulic brake, third malfunctioning portion information indicating that the malfunctioning portion is a parking brake, fourth malfunctioning portion information indicating that the malfunctioning portion is a parking lock mechanism, fifth malfunctioning portion information indicating that the malfunctioning portion is the communication between the power train system 302 and the brake system 304, and sixth malfunctioning portion information indicating that the malfunctioning portion is the communication between the steering system 306 and the brake system 304. The above-described malfunctioning portions are examples and the examples are not limited thereto. Further, as the malfunctioning portion, only the part related to the type of the fail class may be included.

Each of the first malfunctioning portion to the sixth malfunctioning portion is associated with a binary and three-digit numerical value. For example, "000" is associated with the first malfunctioning portion. Further, "001" is associated with the second malfunctioning portion. Further, "010" is associated with the third malfunctioning portion. Further, "011" is associated with the fourth malfunctioning portion. Further, "100" is associated with the fifth malfunctioning portion. Further, "111" is associated with the sixth malfunctioning portion.

(C) The information on the operation mode includes, as an example in FIG. 5, one of first mode information indicating that the operation mode is in a normal state, second mode information indicating that the operation mode is a predetermined fixed mode (for example, an operation mode where the mode is not changed thereafter), third mode information indicating that the operation mode has moved from a backup mode to the stopped state. The above-described operation modes are examples and the examples are not limited thereto. Further, the predetermined fixed mode may be set as, for example, the operation mode of the entire actuator system 30, or may include a plurality of types of fixed modes set for respective actuators or respective devices.

Each of the first mode information to the third mode information is associated with a binary and two-digit numerical value. For example, "00" is associated with the first mode information. Further, "01" is associated with the second mode information. Further, "11" is associated with the third mode information.

As described above, in the various fail classes, information of (A) the influenced vehicle velocity range, (B) the malfunctioning portion, and (C) the operation mode can be added as the additional information to the existing information.

For example, the generation unit 212 of the motion manager 200 generates a fail class using the information received from the actuator system 30, and adds the additional information to the fail class when it is determined that one actuator is not normal.

The transmission unit 214 of the motion manager 200 transmits the generated various fail classes to each application. The motion manager 200 may collectively transmit the various fail classes to each application, or may transmit only a corresponding fail class from among a plurality of fail classes to each application. The type of fail class corresponding to each application may be set, for example, in advance.

Figure 6:
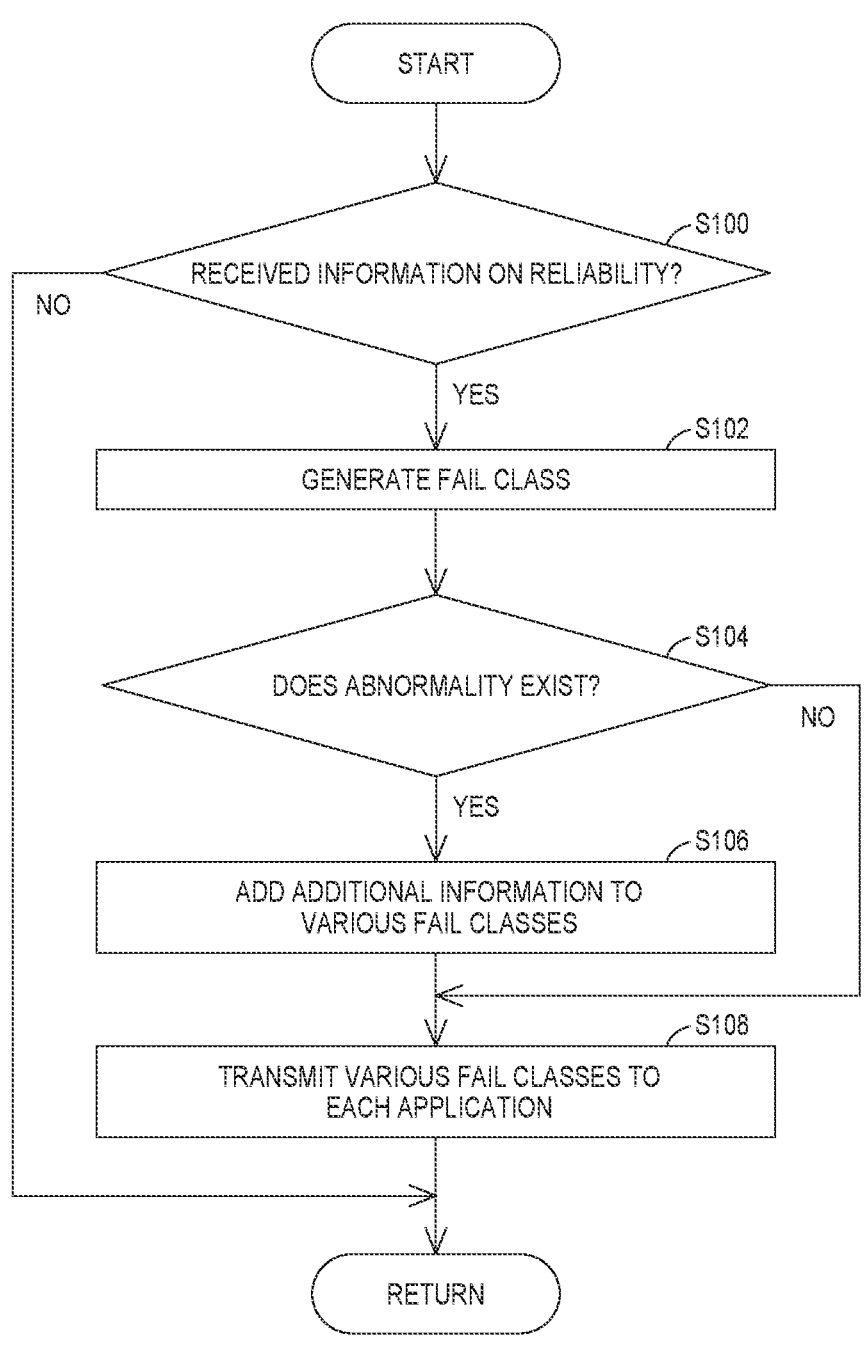
FIG. 6 is a flowchart illustrating an example of processing executed in the motion manager.

Hereinafter, an example of processing executed in the motion manager 200 will be described with reference to FIG. 6. FIG. 6 is a flowchart illustrating an example of the processing executed in the motion manager 200. A series of processes illustrated in this flowchart are repeatedly executed at predetermined control cycles.

At step (hereinafter, step is referred to as S) 100, the motion manager 200 determines whether it has received the information on reliability. Upon receiving, for example, various signals ACL2, BRK2, STR2, and VSS2 from the actuator system 30, the motion manager 200 may determine that it has received the information on reliability. When it is determined that the motion manager 200 has received the information on reliability (YES in S100), the process moves to S102.

In S102, the motion manager 200 generates various fail classes using the received information on reliability.

In S104, the motion manager 200 determines whether an abnormality has occurred in any of the actuators of the actuator system 30. The motion manager 200 determines whether an abnormality has occurred in each actuator, using the received information on reliability. When it is determined that an abnormality has occurred in any of the actuators (YES in S104), the process moves to S106.

In S106, the motion manager 200 adds the additional information to the various fail classes. The motion manager 200 sets the additional information, using the information from the actuator system 30. For example, when the information on reliability of one of the actuators of the actuator system 30 includes information indicating a failed state, the motion manager 200 adds, to the various fail classes, a value of a binary and seven-digit numerical value in which a value indicating the vehicle velocity range that is influenced by the operation of the failed actuator, a value indicating the malfunctioning portion of the failed actuator, and a value indicating the operation mode of the failed actuator after the failure are combined, as the additional information. When it is determined that no abnormality has occurred in any of the actuators (NO in S104), the process moves to S108.

In S108, the motion manager 200 transmits the various fail classes to each application of the driver assistance system 100. When it is determined that the motion manager 200 has not received the information on reliability (NO in S100), the process ends.

The operation of the motion manager 200 based on the above structure and flowchart will be described.

Upon receiving the information on reliability from the actuator system 30 (YES in S100), the motion manager 200 generates various fail classes (S102). Then, the motion manager 200 determines whether an abnormality has occurred in any of the actuators, using the received information on reliability (S104). Upon determining that an abnormality has occurred in any of the actuators (YES in S104), the motion manager 200 adds, to the various fail classes, the additional information including (A) the influenced vehicle velocity range, (B) the malfunctioning portion, and (C) the operation mode (S106), and transmits the various fail classes to each application (S108). In this case, it is possible to change the kinematic plans such that each application stops its function, restarts a system of vehicle 1, retains minimum functions by removing the failed actuator using the additional information or by using the other actuators, or executes backup of the failed actuator.

In this manner, with the motion manager 200 according to the present embodiment, since the motion manager 200 receives, from the actuator in which an abnormality has occurred, the information indicating the function in which the abnormality has occurred and the information for setting the operation of the application corresponding to the abnormality, the application can set the operation at the time of the occurrence of the abnormality by receiving the information from the motion manager 200. For this reason, even when an abnormality occurs in any of the actuators, it is possible to select an appropriate operation (for example, a continuation of the operation, stopping of the operation, retaining of the function, or restarting). At this time, since the information required by the application at the time of the occurrence of the abnormality in the actuator can be received via the motion manager 200, it is possible to restrict the relationship between the driver assistance system 100, the motion manager 200, and the actuator system 30 from becoming complicated. Therefore, it is possible to provide a motion manager, a vehicle, a vehicle control method, and a non-transitory storage medium that can easily execute a design change in an operation of a corresponding application when an actuator is failed.

Further, the additional information for setting the operation of the application corresponding to the abnormality includes each of the information of the influenced vehicle velocity range, the malfunctioning portion, and the operation mode after the occurrence of the abnormality. For this reason, the application can appropriately set the operation at the time of the occurrence of the abnormality by receiving each of the information of the influenced vehicle velocity range, the malfunctioning portion, and the operation mode after the occurrence of the abnormality via the motion manager 200. Further, since the driver assistance system 100 and the actuator system 30 are not requested to directly exchange information therebetween, it is possible to restrict the relationship between the driver assistance system 100, the motion manager 200, and the actuator system 30 from becoming complicated.

Hereinafter, modified examples will be described. In the above-described embodiment, a case is described as an example where, when an abnormality occurs in any of the actuators of the actuator system 30, the motion manager 200 adds the additional information to the various fail classes. However, for example, even when all the actuators are normal, the additional information may be added to the various fail classes. In this case, the motion manager 200 executes the processes illustrated in the flowchart in which the process of S104 is omitted in the flowchart of FIG. 6. Except the omission of the process of S104, the processes are the same as those illustrated in the flowchart of FIG. 6, the detailed description thereof will not be repeated.

Further, in the above-described embodiment, as illustrated in FIG. 5, a case is described as an example where, the additional information includes each of the information of (A) the influence vehicle velocity range, (B) the malfunctioning portion, and (C) the operation mode. However, as illustrated in FIG. 5, the additional information may include, for example, at least one of the information of (A) the influenced vehicle velocity range, (B) the malfunctioning portion, and (C) the operation mode. In this manner as well, since the driver assistance system 100 and the actuator system 30 are not requested to directly exchange information therebetween, it is possible to restrict the relationship between the driver assistance system 100, the motion manager 200, and the actuator system 30 from becoming complicated.

Further, in the above-described embodiment, a case is described where each of the information of the influenced vehicle velocity range, the malfunctioning portion, and the operation mode is transmitted from the actuator system 30 to the motion manager 200. However, the information of the vehicle velocity range corresponding to the failed actuator may be stored in advance in, for example, a memory of the motion manager 200.

Further, in the above-described embodiment, a configuration is described as an example where the motion manager 200 includes the first reception unit 202, the arbitration unit 204, the calculation unit 206, the distribution unit 208, the second reception unit 210, the generation unit 212, and the transmission unit 214. However, the motion manager 200 may have a configuration in which, for example, a first motion manager including at least the first reception unit 202 and the transmission unit 214, and a second motion manager communicable with the first motion manager and including at least the second reception unit 210 are included. In this case, a function of the arbitration unit 204, a function of the calculation unit 206, a function of the distribution unit 208, and a function of the generation unit 212 may be implemented by any of the first motion manager and the second motion manager.

Further, in the above-described embodiment, a case is described where the motion manager 200 generates the fail classes. However, for example, the actuator system 30 may generate the fail classes and add the additional information, or the motion manager 200 may add the additional information to the fail classes generated by the actuator system 30.

The above-described modified examples may be executed by appropriately combining all or a part thereof. The embodiments disclosed in the present disclosure should be considered as illustrative in all points, and not be considered as limited. The scope of the present disclosure is defined by the claims, not by the above description, and is intended to include meanings equivalent to the claims and all modifications within the scope thereof.

What is claimed is:

1. A motion manager configured to request motion of a vehicle according to a kinematic plan on driver assistance of the vehicle to at least one of a plurality of actuators provided in the vehicle, the motion manager comprising one or more processors configured to:

arbitrate a plurality of kinematic plans respectively set in a plurality of applications;

calculate a motion request to the vehicle based on an arbitration result of the kinematic plans;

distribute the motion request to at least one of the actuators; and transmit, to each of the applications, a plurality of fail classes respectively indicating operating states of the actuators, wherein when an abnormality occurs in at least one of the actuators, the fail classes, which are transmitted to each of the applications, include additional information transmitted from an actuator where the abnormality occurs, the additional information being used for setting an operation of an application corresponding to the abnormality from among the applications and including at least one of information indicating a vehicle velocity range influenced by the abnormality, information indicating a portion in which the abnormality occurs, and information indicating an operation mode after occurrence of the abnormality.

2. The motion manager according to claim 1, wherein the additional information for setting the operation of the application corresponding to the abnormality includes each of the information indicating the vehicle velocity range influenced by the abnormality, the information indicating the portion in which the abnormality occurs, and the information indicating the operation mode after occurrence of the abnormality.

3. The motion manager according to claim 1, wherein the portion in which the abnormality occurs includes communication between the actuators.

4. The motion manager according to claim 1, wherein the one or more processors are configured to transmit, to at least the application corresponding to the abnormality from among the applications, information indicating a function in which the abnormality occurs along with the additional information for setting the operation of the application corresponding to the abnormality.

5. The motion manager according to claim 1, wherein the one or more processors are further configured to:
    generate the plurality of fail classes; and
    add the additional information to the generated fail classes when the abnormality occurs in the at least one of the actuators.

6. The motion manager according to claim 5, wherein the one or more processors are further configured to:
    acquire reliability information about a reliability of each of the actuators; and
    use the acquired reliability information to:
        generate the plurality of fail classes,
        determine whether the abnormality occurs in the at least one of the actuators, based on the acquired reliability information, and
        add the additional information to the generated fail classes.

7. The motion manager according to claim 1, wherein the one or more processors are further configured to:
    acquire the plurality of fail classes respectively from the plurality of actuators; and
    add the additional information to the acquired fail classes when the abnormality occurs in the at least one of the actuators.

8. The motion manager according to claim 1, wherein:
    the one or more processors are further configured to acquire the plurality of fail classes respectively from the plurality of actuators; and
    the acquired fail classes include the additional information when the abnormality occurs in the at least one of the actuators.

9. A vehicle comprising:
    a driver assistance system including a plurality of applications configured to independently set each of a plurality of kinematic plans on driver assistance of the vehicle; and
    a motion manager comprising one or more processors configured to:
        request motion of the vehicle according to the kinematic plan set in at least one of the applications to at least one of a plurality of actuators provided in the vehicle; and transmit, to each of the applications, a plurality of fail classes respectively indicating operating states of the actuators, wherein
        when an abnormality occurs in at least one of the actuators, the fail classes, which are transmitted to each of the applications, include additional information transmitted from an actuator where the abnormality occurs, the additional information being used for setting an operation of an application corresponding to the abnormality from among the applications and including at least one of information indicating a vehicle velocity range influenced by the abnormality, information indicating a portion in which the abnormality occurs, and information indicating an operation mode after occurrence of the abnormality.

10. The vehicle according to claim 9, wherein the additional information for setting the operation of the application corresponding to the abnormality includes each of the information indicating the vehicle velocity range influenced by the abnormality, the information indicating the portion in which the abnormality occurs, and the information indicating the operation mode after occurrence of the abnormality.

11. The vehicle according to claim 9, wherein the portion in which the abnormality occurs includes communication between the actuators.

12. The vehicle according to claim 9, wherein the motion manager is configured to transmit, to at least the application corresponding to the abnormality from among the applications, information indicating a function in which the abnormality occurs along with the additional information for setting the operation of the application corresponding to the abnormality.

13. A vehicle control method executed by a computer, the vehicle control method comprising:
    receiving a plurality of kinematic plans from a plurality of applications configured to set the kinematic plans on driver assistance of a vehicle;
    arbitrating the received kinematic plans;
    calculating a motion request to the vehicle based on an arbitration result of the kinematic plans;
    distributing the motion request to at least one of a plurality of actuators provided in the vehicle; and
    transmitting, to each of the applications, a plurality of fail classes respectively indicating operating states of the actuators, wherein
    when an abnormality occurs in at least one of the actuators, the fail classes, which are transmitted to each of the applications, include additional information transmitted from an actuator where the abnormality occurs, the additional information being used for setting an operation of an application corresponding to the abnormality from among the applications and including at least one of information indicating a vehicle velocity range influenced by the abnormality, information indicating a portion in which the abnormality occurs, and information indicating an operation mode after occurrence of the abnormality.

14. A non-transitory storage medium storing instructions that are executable by a computer and that cause the computer to execute functions comprising:
    receiving a plurality of kinematic plans from a plurality of applications configured to set the kinematic plans on driver assistance of a vehicle;
    arbitrating the received kinematic plans;
    calculating a motion request to the vehicle based on an arbitration result of the kinematic plans;

distributing the motion request to at least one of a plurality of actuators provided in the vehicle; and transmitting, to each of the applications, a plurality of fail classes respectively indicating operating states of the actuators, wherein when an abnormality occurs in at least one of the actuators, the fail classes, which are transmitted to each of the applications, include additional information transmitted from an actuator where the abnormality occurs, the additional information being used for setting an operation of the application corresponding to the abnormality from among the applications and including at least one of information indicating a vehicle velocity range influenced by the abnormality, information indicating a portion in which the abnormality occurs, and information indicating an operation mode after occurrence of the abnormality.

\* \* \* \* \*